United States Patent [19]
Suzuki

[11] Patent Number: 5,404,480
[45] Date of Patent: Apr. 4, 1995

[54] INFORMATION PROCESSOR COMPRISING A WRITE BUFFER CIRCUIT CONTAINING AN ADDRESS BUFFER AND A DATA BUFFER CORRESPONDING TO EACH OTHER

[75] Inventor: Hiroaki Suzuki, Tokyo, Japan

[73] Assignee: NEC Corporation, Japan

[21] Appl. No.: 853,940

[22] Filed: Mar. 19, 1992

[30] Foreign Application Priority Data

Apr. 4, 1991 [JP] Japan .................. 3-071364

[51] Int. Cl.⁶ .................. G06F 12/00; G06F 13/00
[52] U.S. Cl. .................. 395/425; 365/189.07; 364/DIG. 1; 364/238.6; 364/240.7; 364/926.1; 364/933.6; 364/939.7; 364/957.6
[58] Field of Search ................ 395/425; 364/200 MS File, 900 MS File; 365/189.07

[56] References Cited

U.S. PATENT DOCUMENTS

| | | | |
|---|---|---|---|
| 4,897,783 | 1/1990 | Nay | 395/425 |
| 4,949,301 | 8/1990 | Joshi et al. | 395/425 |
| 5,010,480 | 4/1991 | Natarajan | 395/250 |
| 5,034,917 | 7/1991 | Bland et al. | 395/425 |
| 5,228,134 | 7/1993 | MacWilliams et al. | 395/425 |
| 5,241,631 | 8/1993 | Smith et al. | 395/325 |
| 5,253,352 | 10/1993 | Olson | 395/425 |

*Primary Examiner*—Joseph L. Dixon
*Assistant Examiner*—Frank J. Asta
*Attorney, Agent, or Firm*—Laff, Whitesel, Conte & Saret, Ltd.

[57] ABSTRACT

The invention assures data consistency at a time of data update. Also, the invention results in a reduction in the access time required to store incoming data. In response to an equality signal from a comparator circuit of a write buffer circuit which is then in an active level, data is immediately read out from a data buffer store having an address corresponding to the equality signal. A unidirectional tristate buffer is provided for temporarily disconnecting an address bus extending between a CPU and the write buffer circuit, again when such equality signal is in an active level. Similarly, a bidirectional tristate buffer is provided for temporarily disconnecting a data bus extending between the CPU and the write buffer circuit. At times a local controller may take over command of buffer storage of data, with an interrupt of the local controller if the central processor seizes command.

6 Claims, 5 Drawing Sheets

INFORMATION PROCESSOR COMPRISING A WRITE BUFFER CIRCUIT CONTAINING AN ADDRESS BUFFER AND A DATA BUFFER CORRESPONDING TO EACH OTHER

BACKGROUND OF THE INVENTION

The invention relates to information processors and more particularly to information processors having a write buffer circuit for temporarily storing data and addresses which are thereafter to be stored in a main memory of the processor, and for writing, storing and reading the data with respect to their addresses.

An information processor of a computer system, for example, often uses a cache memory to speed an access to a main memory. A cache memory is a local, high-speed memory that can rapidly take in data which is thereafter stored in a main memory. That is, a value which is obtained by a first access to the main memory is stored in the cache memory. A second and subsequent access function is performed, not to the main memory, but to the cache memory because it enjoys the benefits of localism, both in space and in time, and because there is a need for enough time to carry out a program execution for giving data access to the main memory.

A cache memory has a write-through system which is one of its control systems. An information processor employing the write-through system first gains a write access to a main memory whenever data is written into the cache memory. This system is adequate for maintaining a consistency of the data stored in the main memory and the cache memory. However, the write access to the main memory may require several times as long as a write access to the cache memory. When the ratio of the stored program instructions increases, there is a competition between the main memory and peripheral I/O devices for gaining access to a data bus, etc., thus degrading overall system performance.

SUMMARY OF THE INVENTION

Accordingly, an object of the invention is to avoid a situation where there is a variation in the same data that is stored in the cache and main memories. Here, an object is to insure a proper operation of the peripheral devices.

Another object of the present invention is to provide an improved information processor which is free from the problems growing out of the long access time required to maintain consistent data in both the cache and main memories.

According to the invention, these and other objects are accomplished by an information processor which comprises a CPU for controlling the operations of the respective components and the processing of data according to a predetermined program. A main memory stores the program and the data and writes, stores and reads the program and the data, with respect to addresses which are assigned by the CPU.

A write buffer circuit includes a FIFO type multi-stage address buffer circuit, a multi-stage comparator circuit and a multi-stage data buffer circuit. There are individual stages of the multi-stages in the address buffer circuit, in the comparator circuit and in the data buffer circuit. The write buffer circuit has a plurality of address buffer stages for storing addresses which are input during a write access time. A comparator circuit having a plurality of individual comparator stages compares the inputted addresses with addresses which are stored in the respective address buffer stages. The comparator gives an output equality signal having an active level when any of the comparator outputs is indicative of an equality between received and stored data.

A FIFO type of data buffer circuit includes a plurality of data buffer stages corresponding to the respective address buffer stages for storing data received during the write access time and for reading out data corresponding to the equality signals having the active level during the time of read access. A local or cache memory buffer stores data during time lags caused by delays in gaining access to the main memory means. An OR circuit derives and outputs a logical sum of the equality signals received from the respective comparators. An address bus is used to transfer addresses between the main memory and the write buffer. A data bus transmits data between the CPU, the write buffer circuit, and the main memory.

To prevent competition between a main memory and peripheral I/O devices for access to data buses, a first tristate buffer circuit separates or sectionalizes the address bus between the write buffer circuit and the main memory for a predetermined read access time period during which the equality signal from the OR circuit is in an active level. Likewise, for the same predetermined read access time period during which the equality signal from the OR circuit is in an active level, a second tri-state buffer circuit separates the data bus between the CPU and the write buffer circuit from the data bus between the write buffer circuit and the main memory. These bus separations prevent a conflict between and non-consistent data storage at different locations.

Further, the write buffer circuit includes an output stage pointer for storing the content of an address corresponding to the active level equality signal. The data of the data buffer circuit is read out according to the content of the output stage pointer.

DETAILED DESCRIPTION OF THE PREFERRED EMBODIMENTS

Figure 1:
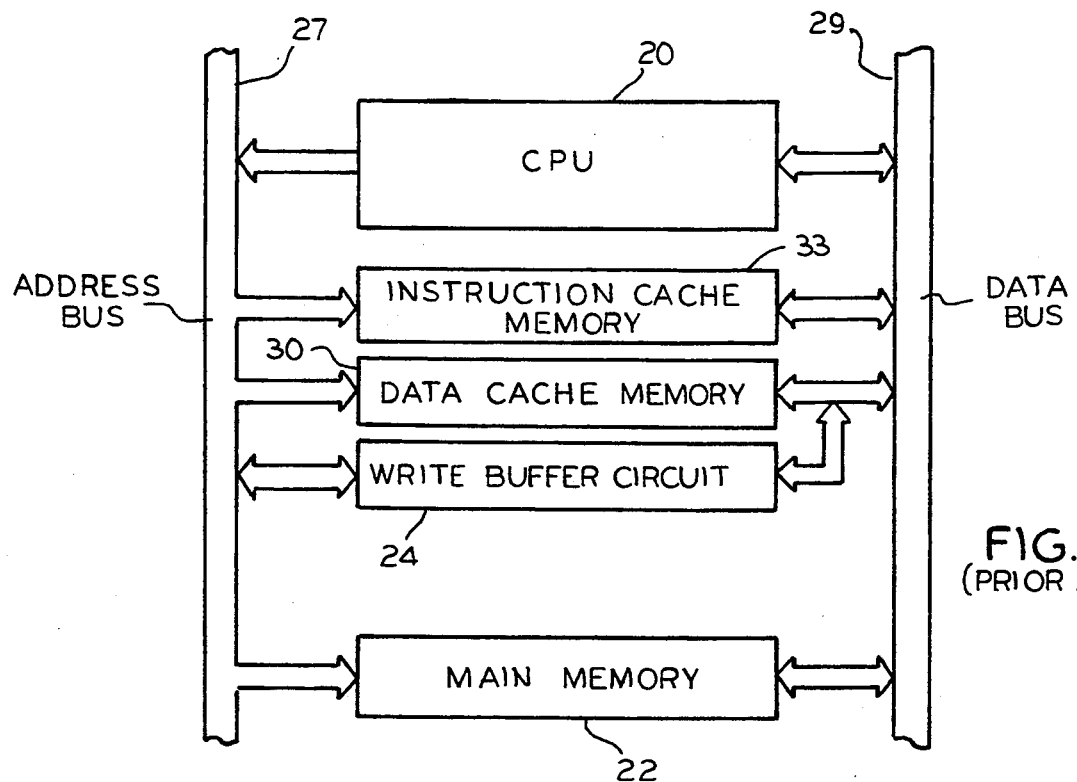
FIG. 1 is a block diagram showing an example of a conventional prior art information processor.
Figure 2:
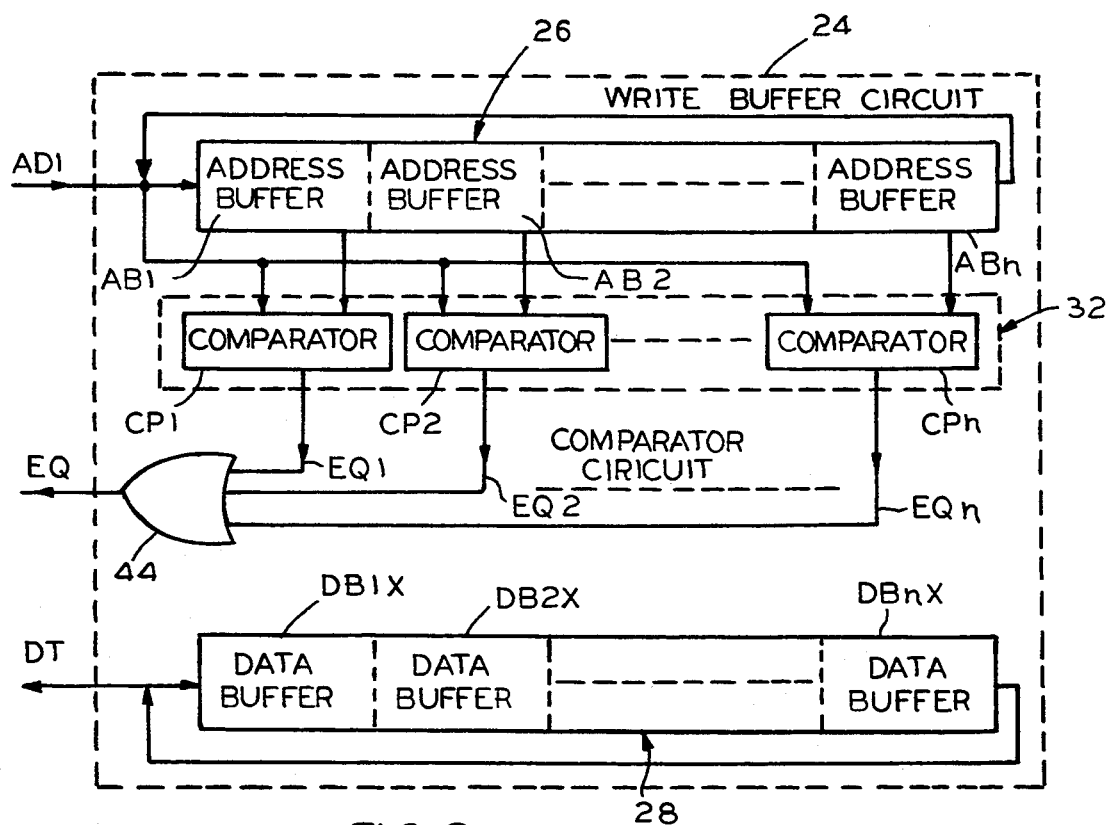
FIG. 2 is a block diagram showing a prior art data buffer circuit used by the information processor of FIG. 1.

In order to compensate for a degradation of system performance, a write buffer circuit may be provided between a central processor unit ("CPU") and a main memory of an information processor. By way of example, FIG. 1 shows such an information processor. FIG. 2 shows a block diagram of a write buffer circuit which may be used by the processor of FIG. 1.

In greater detail, the information processor (FIGS. 1 and 2), requires a central processor unit "CPU"0 20 having a main memory 22. Although the main memory 22 is not actually accessed, addresses and data are initially written into a write buffer circuit 24 (FIG. 2)

containing a first in, first out ("FIFO") type of address buffer circuit 26 and a data buffer circuit 28 respectively. These circuits are inter-connected by address bus 27 and data bus 29.

The write buffer circuit 24 (FIG. 2) comprises a multi-stage address buffer circuit 26 having a plurality of stages AB1, AB2, . . . ABn, a multi-stage comparator circuit 32 having a plurality of stages CP1, CP2, . . . CPn, and a multi-stage data buffer circuit 28 comprising a plurality of stages DB1x, DB2x, . . . DBnx. The separate stages of these multi-stage circuits are individually associated with and correspond to each other, e.g., stages AB1, CP1, and DB1x are individually associated with each other. When there is incoming data, CPU 20 (FIG. 1) assigns addresses which are received at address input ADI (FIG. 2) from address bus 27 (FIG. 1).

Simultaneously, incoming data is received at data input DT from data bus 29. An address is stored in stage AB1, and the corresponding data is stored in data buffer stage DB1x. Then, as stage DB2x becomes available, the data is transferred from stage DB1x to stage DB2x while the address is transferred to address buffer stage AB2 so that stages AB1 and DB1x are ready to receive the next incoming address and data. The process continues until the address and data reach the last stages ABn, DBnx at which time they are transferred from buffer write circuitry to the main memory 28. Thus the data which is first in is also the data which is first out ("FIFO"). When updated data is received, if one of the comparators stages CP1, CP2, . . . CPn finds that there are prestored data in one of the data stages DB1x, DB2x, . . . DBnx, it directs the incoming updated data to that data stage. This updating of data can lead to inconsistency between supposedly the same data stored in data buffer circuit 28 and main memory 22.

After CPU 20 (FIG. 1) terminates the initial write access, it executes the next instruction, which is a write to the main memory 22 performed by the write buffer circuit 24. Since the CPU 20 commands a write to the write buffer circuit 24 simultaneously with a write to a data cache memory 30, a cache memory instruction circuit 33 can continue the execution of its program, generally and without interruption. However, at a time when data is updated, the values which are stored in the write buffer circuit 24 and the main memory 22 may temporarily become different from each other, thus breaking the consistency of the data stored in circuit 24 and main memory 22. Therefore, it is necessary to provide circuits which pay special attention in order to subsequently access the correct stored data.

For example, assume that the CPU 20 sends a write data command to the write buffer circuit 24 and further that the write buffer circuit 24 fails to write the same data into the main memory 22, perhaps because an associated bus is busy. During the time interval while the write buffer circuit 24 fails to immediately write the data, the execution of the program progresses further. Therefore, if the CPU 20 accesses the main memory 22 to use the data written in to the write buffer circuit 24, the CPU 20 will read data which have not yet been updated.

In order to prevent such data inconsistency, the conventional write buffer circuit 24 (FIG. 2) includes a comparator circuit 32 which comprises a plurality of individual comparator stages CP1, CP2, . . . CPn connected to respective outputs of individually associated address buffer circuit 26. If the address which are output from a buffer circuit coincide with an address of received data, comparator 32 gives an equality signal EQ1, EQ2, . . . EQn at the output of OR circuit 44. The read access to the main memory 22 is temporarily stopped in response to this equality signal EQ. After a rewrite of all of the contents of the write buffer circuit 24 into the main memory 22, the read access is restarted. In this case, if only a single data information is rewritten into the main memory 22, the sequence of data written into the main memory 22 becomes different from the sequences of data written into the write buffer circuit 24. Therefore, the peripheral I/O devices, etc., may not always be operated properly.

Figure 3:
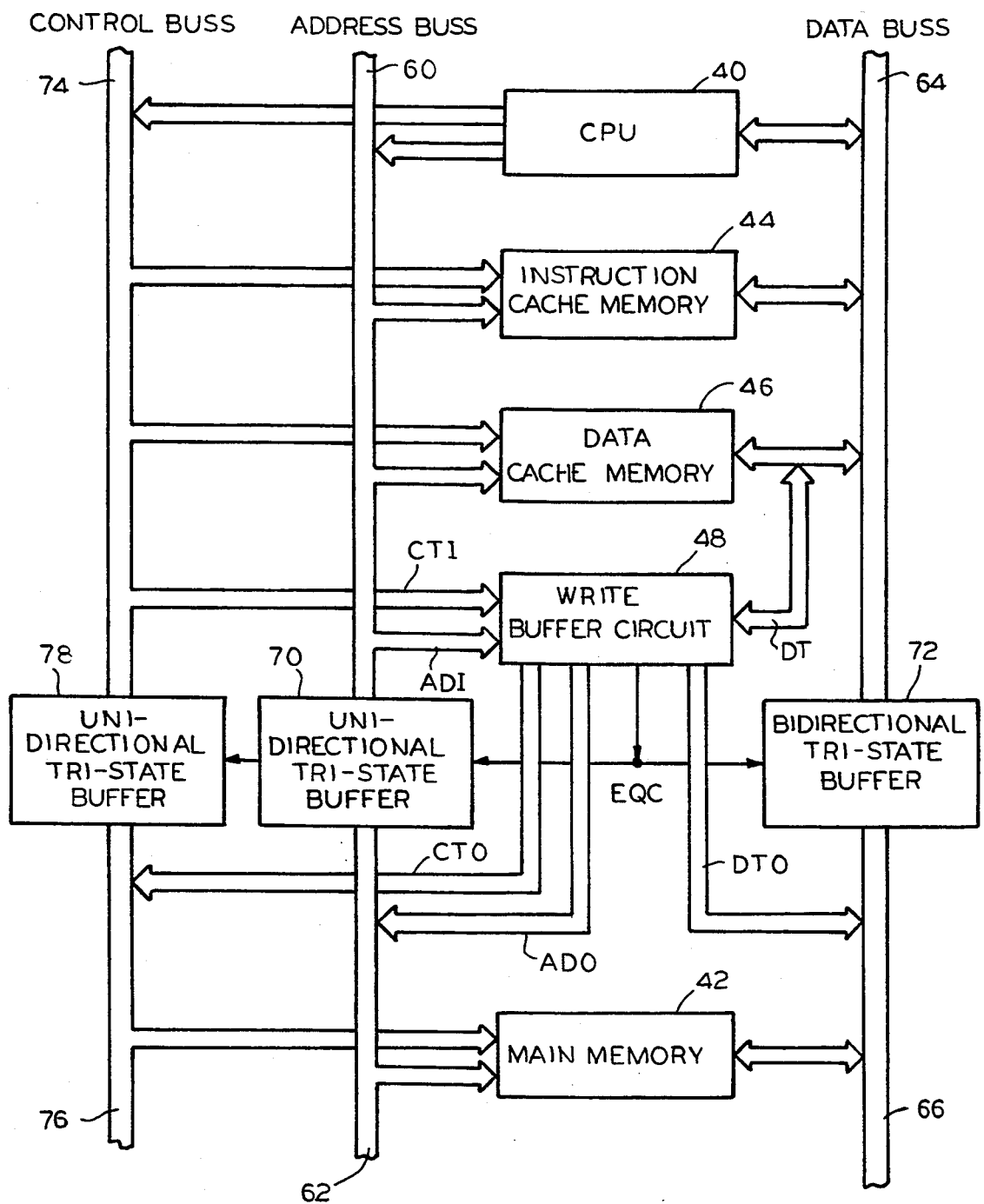
FIG. 3 is a block diagram showing an embodiment of the present invention.

FIG. 3 is a block diagram showing a first embodiment of the invention. According to a predetermined program, the CPU 40 controls the operation of the respective components of the processor and the processing of data. A main memory 42 stores the program and data for writing, storing, and reading data with respect to addresses which are assigned by the CPU 40. An instruction cache memory 44 and a data cache memory 46 store instructions and data when the CPU 40 accesses the main memory 42.

A FIFO type address buffer circuit 48 (FIG. 4) includes an address buffer circuit 50 having a plurality of address buffer stages AB1, AB2, . . . ABn for storing an address received at input ADI which is received at a write access time. A comparator circuit 54, composed of a plurality of individual comparator stages CP1, CP2, . . . CPn, compares the addresses received at input ADI with the addresses stored in the respective address buffers AB1, AB2, . . . ABn and outputs equality signals EQ1, EQ2, . . . EQn of an active level, when any of the outputs of the individual comparators CP1, CP2, . . . CPn indicates an equality between received and stored addresses.

A FIFO type data buffer circuit 56 includes a plurality of data buffer stages DB1, DB2, . . . DBn corresponding to the respective individual address buffers AB1, AB2, . . . ABn. The data buffer stages store data which is received during the write access time and reads out data corresponding to and identified by the equality signal (i.e. one of the signals EQ1, EQ2, . . . EQn). These equality signals are in the active level during a time of a read access. An OR circuit 58 derives a logical sum of the equality signals EQ1, EQ2, . . . EQn from the respective individual comparators CP1, CP2, . . . CPn and outputs the equality signal EQ.

A first section 60 of the address bus (FIG. 3) is used to transfer addresses between the CPU 40, the instruction cache memory 44, the data cache memory 46, and the read/write buffer circuit 48. A second section 62 of the address bus transfers addresses between the write buffer circuit 48, and the main memory 42. A first section 64 of the data bus transmits data between the CPU 40, the instruction cache memory 44, the data cache memory 46, and the write buffer circuit 48. A second section 66 of the data bus transfers data between the write buffer circuit 48 and the main memory 42.

Normally the respective address bus sections 60, 62 and the data bus sections 64, 66 are joined so that CPU 40 and main memory 42 are in direct communication with each other. During periods in the operation, the bus sections are separated from each other to preclude a confusion between buffer and main memory information storage.

More particularly, a unidirectional tristate buffer 70 opens and closes the address bus to separate the first section 60 address bus from the second section 62 of the address bus. This process is accomplished during a predetermined time period while an equality signal EQ at the output of the OR circuit 58 (FIG. 4) is in an active level, and during the time of the write access. A bidirectional tristate buffer 72 (FIG. 3) opens and closes the data bus, thereby separating it into a first section 64 and the second section 66, respectively, of the data bus. This process is accomplished during a predetermined time period while the equality signal EQ from an OR circuit 58 (FIG. 4) is in an active level, and during the time of the read access.

The system shown in FIG. 3 further includes a control bus which may be divided into sections 74, 76, corresponding to the divisions of the address and data buses. Control bus 74, 76 is used for transferring control information which is representative of a write access or a read access from CPU 40 to the memories 44, 46 and 42 and the write buffer circuit 48. A unidirectional tristate buffer 78 is coupled between the control bus 74 and 76 in order to separate or join them.

The write buffer circuit 48 (FIG. 4) includes a read-/write control circuit 80 which responds to the control information received at input CTI from the control bus section 74 to produce a set of internal read/write control signals 82 for controlling the respective operations of the address and data buffer circuits 50 and 56 and the comparator circuit 54. As mentioned before, each of the circuits 50, 54, and 56 is a multi-stage construction. The separate stages of these multi-stage circuits are individually associated with and correspond to each other.

When there is incoming data, CPU assigned addresses are received at input ADI from the bus 60 and incoming data are received at input DT from the bus 64. The addresses and data outputted from CPU 40 (FIG. 3) in the write access to the main memory 42 are respectively stored into the buffer circuits 50 and 56 from the last stages ABn and DBn to the first stages AB1 and DB1, in that order, responsive to a control of the controller 80. When the address, data, and control buses 60, 62; 64, 66; and 74, 76 are free, i.e., when the buses are not being used by CPU 40 or other I/O units (not shown), the read/write controller 80 (FIG. 4) initiates a write access in order to write the data stored in the data buffer circuit 56 by transferring the stored address and data from the last stages ABn and DBn, respectively, to outputs ADO and DTO. The information remaining in the buffer circuits 50 and 56 is then shifted rightward. Thus, the data which is first in is also the data which is first out.

In operation, when the CPU 40 (FIG. 3) grants a write access to the main memory 42, address information at terminal ADI (FIG. 4) and data at input terminal DT are written not in the main memory 42, (FIG. 3) but in the address buffer circuit 50 (FIG. 4) and in the data buffer circuit 56 respectively, of the write buffer circuit 48. When the write operation is terminated to the address buffer circuit 50 and as to the data buffer circuit 56, the write buffer circuit 48 (FIG. 4) sends a write completion signal to the CPU 40, which continues its operation.

When the write buffer circuit 48 (FIG. 3) is not empty and the buses are free, it performs a write to the main memory 42. This writing of data into the main memory 42 is performed in a sequence which is the same as the sequence of the data which is input to the write buffer circuit 48.

When CPU 40 is requested to read data from the main memory 42, it initiates a read access bus cycle by sending both a read access control information and a read address onto the buses 60 and 74, respectively. In response to the read access control information on the bus 74 (i.e. at input CTI (FIG. 4)), the read/write controller 80 in the write buffer circuit 48 detects the read access request from CPU 40. If the controller 80 is performing the data write operation to the main memory 42 (FIG. 3) at this time, it suspends that operation. The comparator circuit 54 is then activated by the control signals 82. The address buffer circuit 50 is brought into an inactive state. The address then appearing at input is received from the first section 60 of the address bus ADI.

Figure 4:
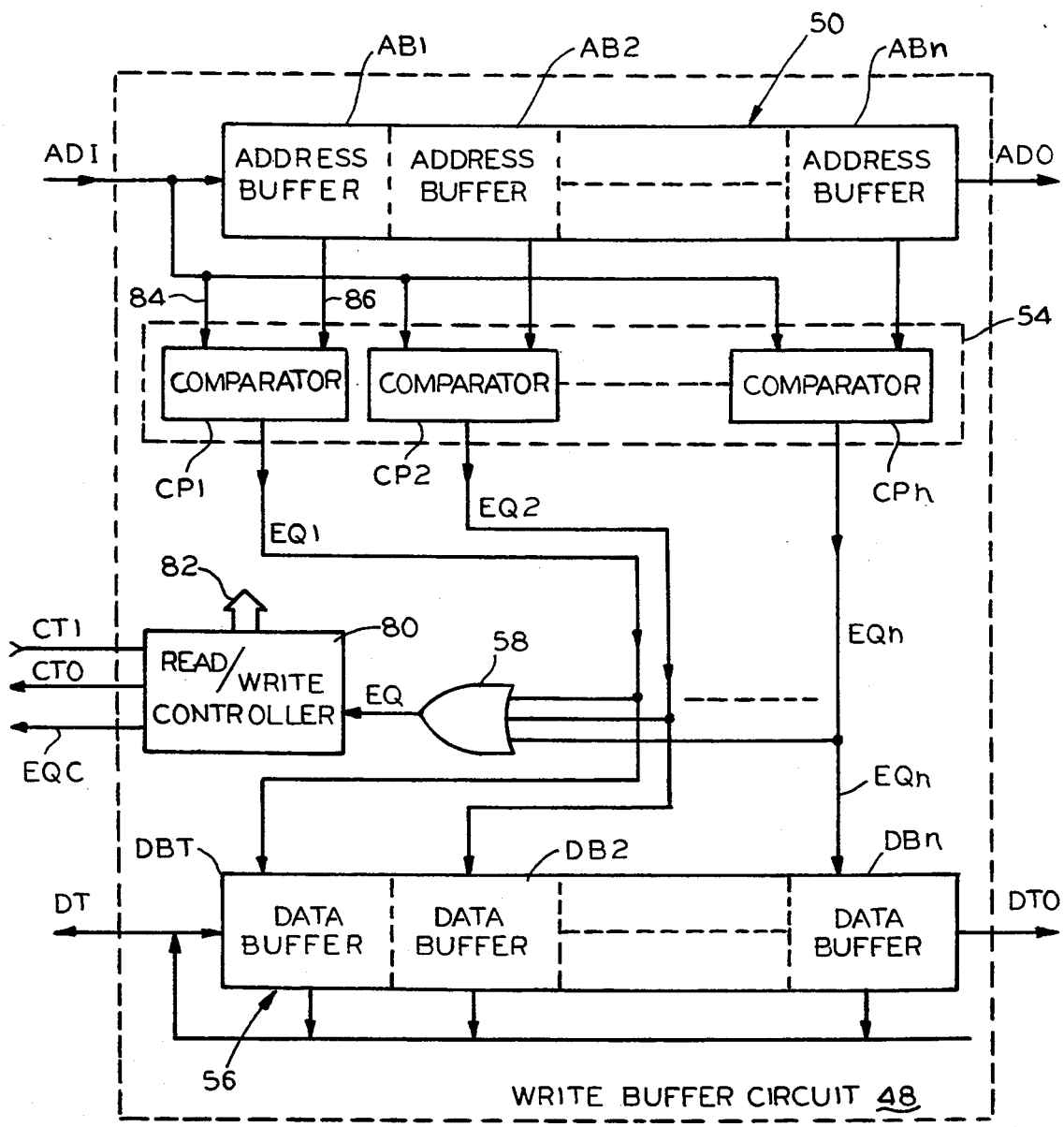
FIG. 4 is a block diagram of a data buffer circuit for use in the embodiment shown in FIG. 3.

The comparator circuit 54 compares the address received at input ADI with the content of the address buffer circuit 50 (FIG. 4). The comparator circuit 54 provides equality signals EQ1, EQ2, . . . EQn when the comparison finds an equality between an incoming address and an address stored in an address stage (for example, signals appearing at inputs 84, 86 for comparator stage CP1).

If any of these equality signals EQ1, EQ2, . . . EQn appears in an active level, OR circuit 58 provides an external active level equality signal EQ.

In response thereto, the controller 80 generates the signal at output terminal EQC to bring the tri-state buffers 70, 72 and 82 into a high impedance state, which separates the buses into their separate section. The bus sections 76, 62, 66 (FIG. 3) are disconnected from CPU 40. On the other hand, assuming that the signal EQ2 (FIG. 4) takes the active level, the data buffer DB2, corresponding to the active level signal EQ2, outputs the data stored therein to the output data bus terminal DTO. This data is thus transferred to CPU 40 through the data bus terminal 64 as the actual data which CPU 40 wants. Since the bus sections 62, 66, 76 are separated from the CPU 40, the read/write controller 80 (FIG. 4) resumes the data write access to the main memory 42, by using the control bus output terminal CTO to control bus section 76, address bus output terminal ADO to address bus section 62 and data bus output terminal to DTO to data bus section 66. This transfer of information over bus sections 62, 66, 76 occurs simultaneously with the transferring of the information to CPU 40 via bus sections 60, 64 and 74. Thus, the updated data which CPU 40 needs, due to the execution of a current instruction, remains in the write buffer circuit 48 while it is not yet stored in the main memory 42. Also, CPU 40 receives the updated data immediately while the data write sequence to the main memory 42 being held during the data input sequence to the write buffer circuit 48.

Figure 5:
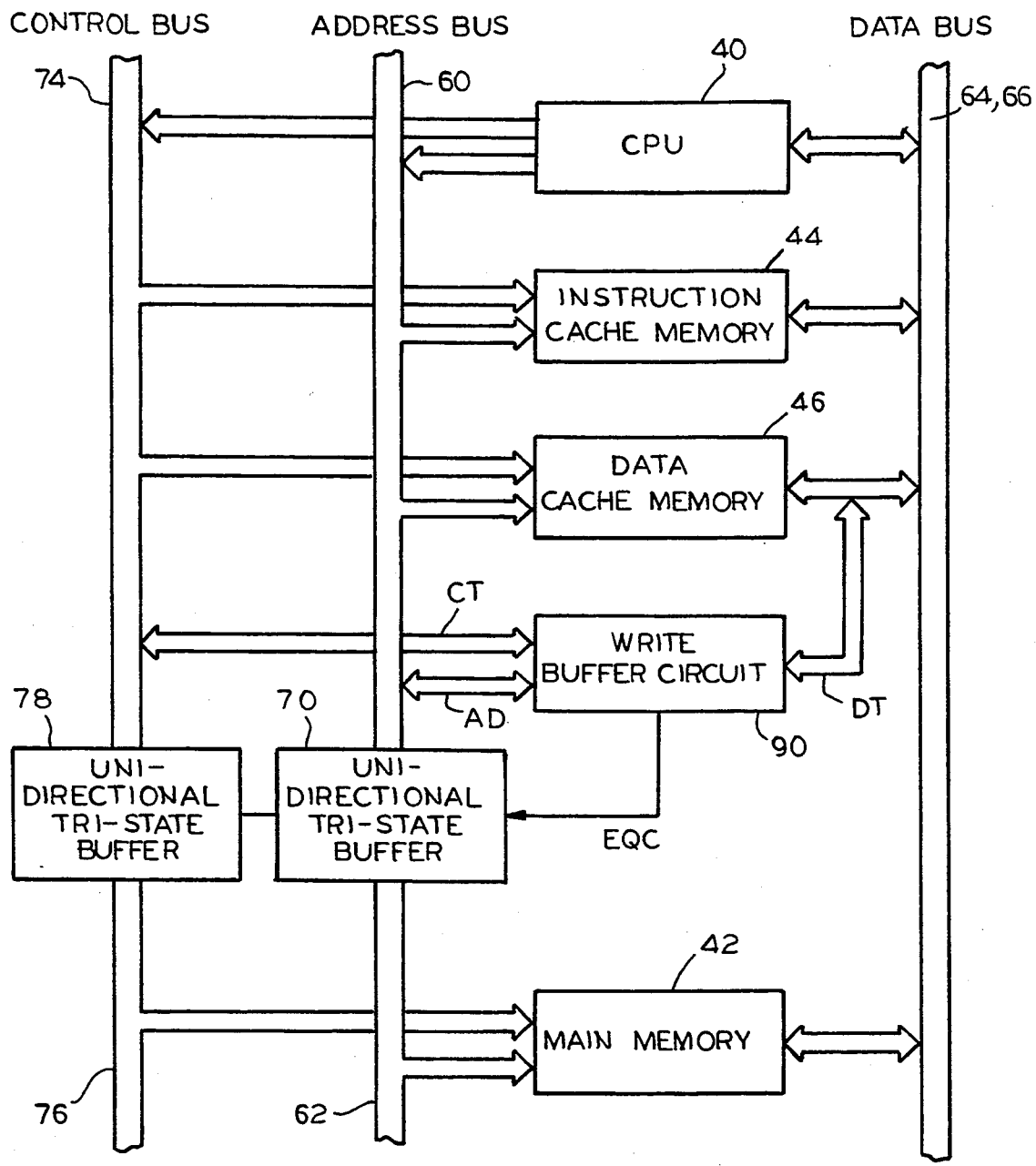
FIG. 5 is a block diagram showing another embodiment of a data buffer circuit.

A second embodiment is shown in FIG. 5, in which the same parts are denoted by the same reference numerals.

Figure 6:
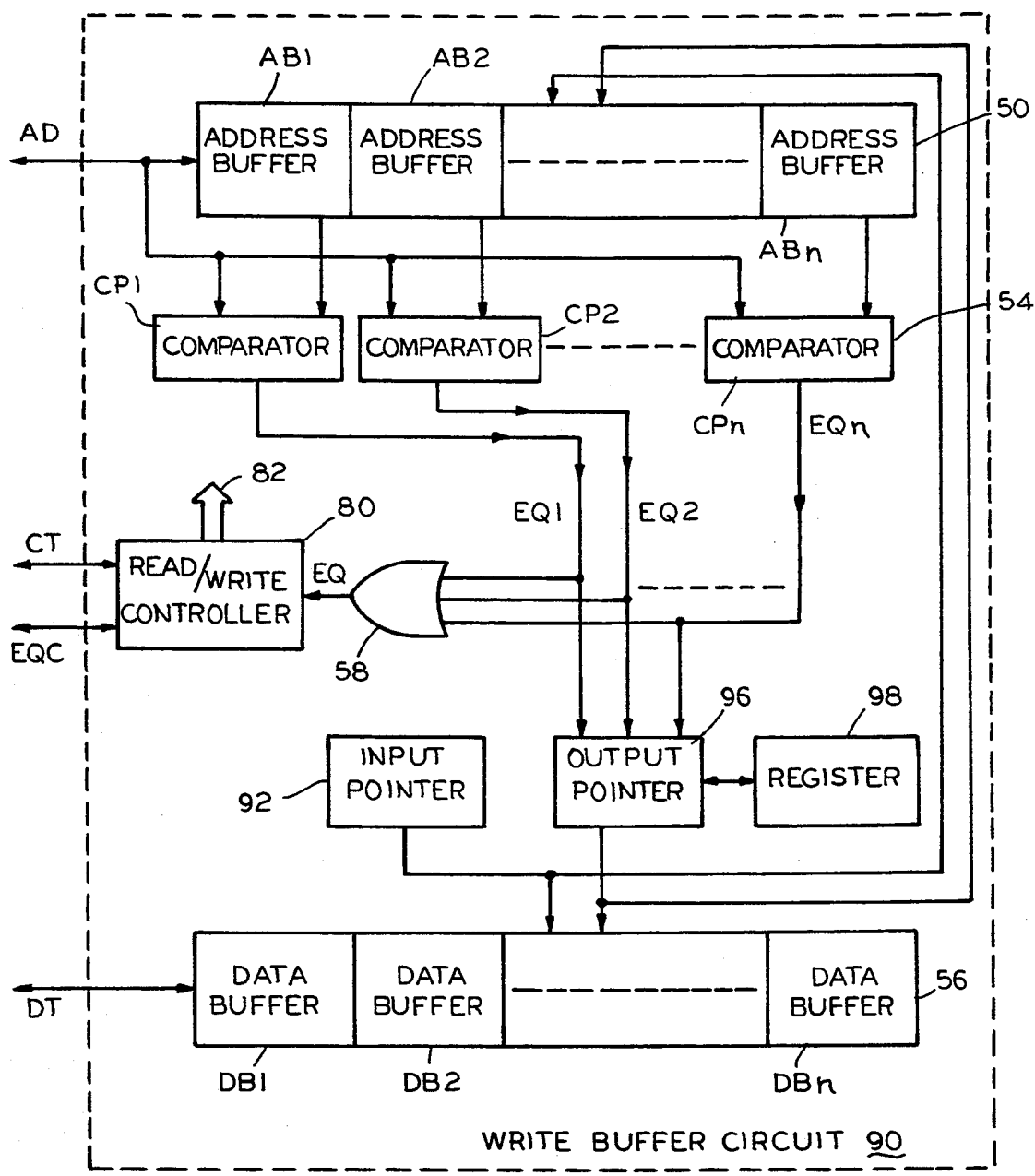
FIG. 6 is a circuit diagram showing a data buffer circuit of the information processor shown in FIG. 5.

In this embodiment, the tristate buffer 72 (FIG. 3) is omitted. In addition, the write buffer circuit 90 (FIG. 6) is different from circuit 40 since circuit 90 does not have the control output bus terminal CTO, address output bus terminal ADO, and data output bus terminal DTO. Instead, write buffer circuit 90 has a bidirectional control bus terminal CT and a bidirectional address bus terminal AD.

The write buffer circuit 90 (FIG. 6) includes an input pointer 92, an output pointer 96 and a register 98 in addition to the elements shown in FIG. 4. The contents of the input pointer 92 designate the address and data buffers into which the incoming address and data are to be stored, respectively. The contents of the output pointer 96 designate one of the address stages AB1 . . . ABn and data stages DB1 . . . DBn from which the address and data are to be outputted. The input and output pointers 92 and 96 are controlled by the read/write controller 80 so that the address and data which are first in are those which are first out. During periods when the operation of the read/write controller 80 is interrupted, the output pointer 96 information is temporarily stored in a register 98. That pointer information is returned to output pointer 96 when the interruption ends.

In operation, when the buses 60, 62; 64, 66; 74, 76 (FIG. 5) are free, the write buffer circuit 90 performs the data write operation directly to the main memory 42 instead of using the CPU, as described above. When CPU 40 initiates a data read access to the main memory 42, the controller 80 (FIG. 6) detects that access at input terminal CT in response to the information appearing on the control bus 74. The controller 80 interrupts its operation and suspends the data write operation to the main memory 42 and then activates the comparators 54.

Assuming that the data which CPU 40 (FIG. 5) needs is stored in the data buffer 56 and not in the main memory 42, either one of the comparator stages CP1...CPn produces the active level signal EQ1 and OR gate 58 generates the active level signal EQ. In response to the interrupt, the controller 80 changes the signal 82 to the active level in order to bring the tristate buffers 70 and 78 (FIG. 5) into the high impedance state, thus sectionalizing the address and control buses. The controller 80 (FIG. 6) further saves the present contents of the output pointer 96 by reading it into the register 98. Then, the output pointer 96 captures the outputs of the comparators 54. The outputs of the comparator 54 indicate the particular stage of data buffer 56 which is storing the data which CPU 40 needs. That identified data is then transferred to CPU 40 via the buses DT and 64, 66.

Since the control and address bus sections 76 and 62 are now separated from bus sections 60, 74, the main memory 42 does not have the data access. When CPU 40 receives the data, it terminates the data read access to the main memory 42 and then executes the next programmed instruction. Since the read address on the bus section 60 disappears, all the signals EQ1, EQ2 and EQn are changed to the inactive level. Therefore, the tristate buffers 70 and 78 are activated to reconnect the bus sections 60 and 74 to the bus sections 62 and 76, respectively. In response to the end of the interrupt, the inactive level of the equality signal EQ at the output of OR circuit 58 (FIG. 6) ends and the controller 80 returns the contents of the register 98 to the output pointer 96. If the next instruction does not require CPU 40 to initiate a read or write access bus cycle, the controller 80 resumes the data write operation to the main memory 42 because the buses are joined in their free state.

According to the present invention, at the time of a read access when there is an aimed data in the write buffer circuit, the data is read directly from the write buffer circuit. There is no need for a two-step access first including a rewrite of data from the write buffer circuit to the main memory and then an access to the main memory. Thus, there is no inconsistency of data at a time data update. Hence, the access time is shortened.

Those who are skilled in the art will readily perceive how to modify the invention. Therefore, the appended claims are to be construed to cover all equivalent structures which fall within the true scope and spirit of the invention.

What is claimed is:

1. A information processor comprising a central processing unit, a main memory coupled to said central processing unit via a bus, said central processing unit issuing a data-write request with a transfer of a write-data to be written into said main memory and thereafter issuing a data-read request to fetch said write-data from said main memory, and a write buffer circuit coupled to said bus for temporarily storing said write-data, whereby said write data is not immediately stored in said main memory, said write buffer circuit performing a data-write operation to said main memory in place of said central processing unit in order to write said write-data into said main memory while said bus is free from said central processing unit said write data being deleted from said write buffer circuit after said write data is written into said main memory, and said write buffer circuit returning said write-data to said central processing unit in place of said main memory when said central processing unit issues said data-read request before said write buffer circuit writes said write-data into said main memory.

2. The information processor as claimed in claim 1, wherein said write-data is read out from said main memory and is transferred to said central processing unit when said data-read request is issued after said write buffer circuit writes said write-data into said main memory.

3. A central information processing unit comprising, a main memory coupled to said central information processing unit via a bus, said central information processing unit transferring over said bus a write-address to be used for accessing an address of said main memory and a write data to be written into said address of said main memory, and a write control buffer circuit coupled to said bus in order to temporarily store said write-address and said write-data received from the central information processing unit and to perform a data-write operation to said main memory said write-data is not immediately stored in said central processing unit in order to write said write-data into said address of said main memory in response to a use of said write-address, said write-data and said write-address being deleted from said write control buffer after said write-data is written into said main memory, said central processing unit issuing a data-read request by transferring a read address over said bus to fetch a read-data from said main memory, and said write control buffer circuit returning said write-data to said central processing unit as said read-data, whereby said write-data had not been stored in said main memory and said read-address is coincident with said write-address which is still stored in said write buffer circuit.

4. An information processor comprising a CPU, a main memory for storing data corresponding to addresses supplied from said CPU in a write mode, supplying data a corresponding to addresses supplied from said CPU in a read mode, a write buffer circuit for temporarily storing data and addresses which are thereafter to be stored in said main memory wherein said write buffer circuit supplies stored data to said main memory independently of said CPU operation and does not continue to store said data after supplying said data in said write mode, said write buffer circuit supplying a data to CPU when said write buffer circuit is storing said data which has been requested by said CPU in said read mode.

5. An information processor claimed in claim 4, said write buffer circuit including a data buffer circuit comprising a plurality of address buffer stages for storing said addresses, a comparator circuit having a plurality of individual comparator stages for comparing inputted addresses with addresses stored in said respective address buffer stages and for outputting equality signals having an active level in response to said comparator stages finding a coincidence between said inputted and stored addresses, and a plurality of individual data buffer stages individually corresponding to said respective address buffer stages.

6. An information processor claimed in claim 5, said write buffer circuit further including an output stage pointer for storing an address corresponding to an address which said comparator finds when said equality signal is in said active level, whereby data is read out of said data buffer circuit in response to the content of said output stage pointer means.

* * * * *